(12) United States Patent
Khoo

(10) Patent No.: US 8,620,735 B2
(45) Date of Patent: Dec. 31, 2013

(54) LOCATION CALENDAR TARGETED ADVERTISEMENTS

(76) Inventor: Denis Khoo, Arcadia, CA (US)

(*) Notice: Subject to any disclaimer, the term of this patent is extended or adjusted under 35 U.S.C. 154(b) by 777 days.

(21) Appl. No.: 11/838,890

(22) Filed: Aug. 15, 2007

(65) Prior Publication Data

US 2008/0021728 A1 Jan. 24, 2008

Related U.S. Application Data

(63) Continuation-in-part of application No. 11/781,951, filed on Jul. 24, 2007, which is a continuation-in-part of application No. 10/884,357, filed on Jul. 2, 2004, now abandoned.

(51) Int. Cl.
*G06Q 99/00* (2006.01)
*G06Q 30/00* (2012.01)

(52) U.S. Cl.
USPC ........................... 705/14.1; 705/319

(58) Field of Classification Search
USPC ....................................... 705/1, 14
See application file for complete search history.

(56) References Cited

U.S. PATENT DOCUMENTS

| | | | |
|---|---|---|---|
| 6,317,718 B1* | 11/2001 | Fano | 705/1.1 |
| 6,487,538 B1* | 11/2002 | Gupta et al. | 705/14.66 |
| 6,510,424 B1* | 1/2003 | Ford et al. | 1/1 |
| 7,124,087 B1* | 10/2006 | Rodriguez et al. | 705/1.1 |
| 7,136,875 B2 | 11/2006 | Anderson et al. | |
| 7,225,142 B1* | 5/2007 | Apte et al. | 705/14.39 |
| 2002/0082877 A1* | 6/2002 | Schiff et al. | 705/5 |
| 2002/0091556 A1* | 7/2002 | Fiala et al. | 705/6 |
| 2002/0194589 A1* | 12/2002 | Cristofalo et al. | 725/32 |
| 2004/0015397 A1 | 1/2004 | Barry et al. | |
| 2004/0193488 A1 | 9/2004 | Khoo et al. | |
| 2004/0220854 A1* | 11/2004 | Postrel | 705/14 |
| 2005/0131762 A1 | 6/2005 | Bharat et al. | |
| 2005/0144066 A1* | 6/2005 | Cope et al. | 705/14 |
| 2005/0144069 A1 | 6/2005 | Wiseman et al. | |
| 2006/0004789 A1* | 1/2006 | Lunt et al. | 707/100 |

OTHER PUBLICATIONS

Expedia, Inc., Online Advertising Program, Marketing Material from Expedia, Inc., 2006.

* cited by examiner

*Primary Examiner* — Jami A Plucinski
*Assistant Examiner* — Shaun Sensenig
(74) *Attorney, Agent, or Firm* — Yudell Isidore Ng Russell PLLC

(57) ABSTRACT

A method and system is described for targeting advertisements to a targeted travel habit. A targeted travel habit is comprised of a derived travel habit and associated values for any variables relevant to the derived travel habit. A derived travel habit allows targeting an advertisement towards a specific travel habit of a traveler, and utilizes the raw data entered by a traveler into a location calendar system. This raw data includes the traveler's home locations and travel plans. Raw data may be for the past, present, or future.

14 Claims, 23 Drawing Sheets

200

220  210

Conventional Electronic Calendar

| Mon | Tue | Wed | Thu | Fri | Sat | Sun |
|---|---|---|---|---|---|---|
| April 30 | May 1 | 2 | 3 | 4 | 5 | 6 |
| 7 | 8 | 9 | 10 | 11 | 12 | 13 |
| 14 | 15 | 16 | 17 | 18 | 19 | 20 |
| 21 | 22 | 23 | 24 | 25 | 26 | 27 |
| 28 | 29 | 30 | 31 | June 1 | 2 | 3 |

Conventional Electronic Calendar

| Mon | Tue | Wed | Thu | Fri | Sat | Sun |
|---|---|---|---|---|---|---|
| April 30 | May 1 | 2 | 3 | 4 | 5 | 6 |
| 7 | 8 | 9 | 10 Meeting 310 | 11 | 12 | 13 |
| 14 Lunch 320 | 15 | 16 | 17 | 18 | 19 Camping with family 330 | 20 |
| 21 | 22 | 23 | 24 | 25 | 26 | 27 Wedding 340 |
| 28 | 29 | 30 | 31 | June 1 | 2 | 3 |

Enter your future travel plans

| From Date: | | From Time: | | 810 |
| To Date: | | To Time: | | |

| City, State: | | Longitude: | | 820 |
| Zip Code: | | Latitude: | | |
| Country: | | | | |

Purpose:
○ Business
○ Pleasure

830

Assign a name to this travel plan:

840

Enter transit data for getting to destination 850

Departure Date and Time:     Departure Airport:
Arrival Date and Time:     Arrival Airport:

Enter transit data for returning from destination 860

Departure Date and Time:     Departure Airport:
Arrival Date and Time:     Arrival Airport:

Electronic Location Calendar

220  210

| Mon | Tue | Wed | Thu | Fri | Sat | Sun |
|---|---|---|---|---|---|---|
| April 30 | May 1 | 2 | 3 | 4 | 5 | 6 |
| San Francisco, CA 910 | | | | | | |
| 7 | 8 | 9 | 10 | 11 | 12 | 13 |
| San Francisco, CA 910 | | | | | | |
| 14 | 15 | 16 | 17 | 18 | 19 | 20 |
| San Francisco, CA 910 | | 920 | Seattle, WA 930 | | | |
| 21 | 22 | 23 | 24 | 25 | 26 | 27 |
| Seattle, WA 930 | | | Los Angeles, CA 940 | | Seattle, WA 930 | |
| 28 | 29 | 30 | 31 | June 1 | 2 | 3 |
| Seattle, WA 930 | | 950 | New York, NY 970 | 960 | Seattle, WA 930 | |

People who you can meet during your trip to Los Angeles, CA (5/24/05 6am – 5/25/05 10pm)

Max degrees of separations: 1

Max distance: 50mi 1040    1050

| Name | Location | Overlapping Dates/Times |
|---|---|---|
| John Doe | New York, NY | 5/30/07  5am – 6/1/07 7pm |
| Tom Smith | New York, NY | 5/30/07 5am – 5/31/07 9:30pm |
| Cindy Perez | New York, NY | 5/30/07  5am – 6/1/07 7pm |
| Peter Lee | Union City, NJ | 5/30/07  5am – 6/1/07 7pm |
| Frank Jones | Ridgewood, NY | 5/30/07  3pm – 6/1/07 7pm |

Place a New Advertisement

General Info

Name: [ ]  Start Date: [ ]

Max $: [ ]  End Date: [ ]

— 1610

Ad Info

Ad Title: [ ]

URL: [ ]  1620

Description: [ ]

1630

Target Info

Travel Habit: [Flight Route Frequency ▼]   CPM: $22.40

Airport X: [ ]

Airport Y: [ ]

At least [ ] times between [ ] and [ ]

Place a New Advertisement

General Info

Name: [____]  Start Date: [____]

Max $: [____]  End Date: [____]

— 1710

Ad Info

Ad Title: [____]

URL: [____]    1720

Description: [____]

1730

Target Info

Travel Habit: [Miles Traveled for Work ▼]   CPM: $15.00

At least [__] miles between [____] and [____]

using these methods of transit:  ☒ ANY
                                   ☒ Airline
                                   ☒ Train
                                   ☒ Ship
                                   ☒ Bus
                                   ☒ Self (Drive)

Place a New Advertisement

General Info

Name: ☐     Start Date: ☐

Max $: ☐     End Date: ☐

— 1810

Ad Info

Ad Title: ☐

URL: ☐

Description: ☐

1820

Target Info

Travel Habit: [# of Days In City for Travel ▼]    CPM: $30.25

At least ☐ days between ☐ and ☐ within a ☐ mile radius of ☐

Location Calendar    1910    Welcome John Doe. Sign Out

Fly ABC Airlines
Your best fares between
LAX and JFK.
www.abcairlines.com

New York Restaurants
Find fine dining in
New York
www.nyrestaurantswebsite.com

Save a Trip
Video Conference Your
Next Meeting
www.excelvideoconf.com

◀ ▶

| Mon | Tue | Wed | Thu | Fri | Sat | Sun |
|---|---|---|---|---|---|---|
| April 30 | May 1 | 2 | 3 | 4 | 5 | 6 |
| San Francisco, CA | | | | | | |
| 7 | 8 | 9 | 10 | 11 | 12 | 13 |
| San Francisco, CA | | | | | | |
| 14 | 15 | 16 | 17 | 18 | 19 | 20 |
| San Francisco, CA | | Seattle, WA | | | | |
| 21 | 22 | 23 | 24 | 25 | 26 | 27 |
| Seattle, WA | | | Los Angeles, CA | | Seattle, WA | |
| 28 | 29 | 30 | 31 | June 1 | 2 | 3 |
| Seattle, WA | | New York, NY | | | Seattle, WA | |

FIG. 19

LOCATION CALENDAR TARGETED ADVERTISEMENTS

This is a Continuation-in-Part of application Ser. No. 11/781,951 filed Jul. 24, 2007, which is a Continuation-in-Part of application Ser. No. 10/884,357, filed Jul. 2, 2004 now abandoned. The listed applications are incorporated herein by reference in their entirety.

BACKGROUND OF THE INVENTION

1. Field of the Invention

The present invention relates generally to targeted online advertisements, and more particularly, to targeted online advertisements based on data from an electronic location calendar.

2. Description of the Related Art

There has long been a desire by advertisers to more effectively target their advertisements in order to avoid wasted impressions and more efficiently utilize their ad budgets. In contrast to advertising on traditional media, such as television, radio, and print publications, advertising on the internet, or interactive media, has become popular among advertisers because of new targeting capabilities.

Early on in interactive media, advertisers were given the ability to target their advertisements to specific websites, and did so base on the audience demographics of the website. Advertisers were also able to target within specific sections of a specific website, such as the sports section or real estate section. This level of targeting was not such a great leap over traditional media.

In cases where a website had user registration data, advertisers were able to target specific demographic data obtained from the registration process. For example, a fictional website, such as www.ANewspaperExample.com might require users to register in order to view content. In such a case, they may collect demographic information such as the user's gender. With this demographic readily available on www.ANewspaperExample.com, advertisers are given the capability to target based on this data. For example, an advertiser may have an ad campaign where they may only want to target males, which they can now do with www.ANewspaperExample.com.

In many cases however, websites do not require registration, as it deters users away from the site. This is especially true of websites that are focused with online publication of content. Advertisers are able to target based on content in these cases. So instead of targeting a user specifically, advertisers can select to target their display of ads on a webpage based on the content contained within that webpage. For example, an advertiser may have an advertisement which is to be targeted to the keyword "toothbrush," which will cause the advertisement to be displayed on web-pages which have mention of the word "toothbrush."

Ads that are targeted based on content can also be used within search engines. Continuing with the example above, if there is an advertisement associated with the keyword "toothpaste," this ad might be displayed whenever a user goes to a search engine and performs a search for the word "toothpaste." Although similar, this form of advertising is commonly referred to as keyword-targeted advertising, and the example in the previous paragraph is referred to as content-targeted advertising.

Although keyword-targeted advertising and content-targeted advertising has provided major strides in targeting in the interactive media space, it is strongly believed that more effective means of targeting may exist. One new field of advertising that is growing in popularity is known has behavioral targeting. As the name implies, this type of targeting give the advertiser the capability to target based on the user's current behavior. For example, if a user visits a series of websites implying that the user is researching different types of blenders, an advertiser, such as a retailer, can target this user and display an ad showing the user a blender for sale. Behavioral targeting requires complex logic to determine the user's behavior based on the user's profile along with webpages the user is visiting. In addition, because much of the data is being collected real-time, it requires heavy processing capabilities.

A couple other related art to this invention include the social network and the electronic location calendar (aka travel calendar). Social networking technology and electronic location calendar technology can be combined to greatly assist travelers in staying in touch with friends, family, and associates.

Travelers, especially business travelers, are finding themselves traveling alone and for an extended period. They are also finding that they are traveling to destinations completely foreign and unfamiliar to them. Whether or not they are traveling alone, travelers typically would like the opportunity to find and meet with related individuals, such as friends, family members, business associates, or even friends of friends while at their travel destination.

Typically, in order to accomplish this task, the traveler would first have to perform the step 100 of keeping track of related individuals by using a paper or electronic organizer. Upon completing the step 110 of determining travel plans, the traveler must then perform the step 120 of contacting each related individual in order to determine if that related individual will be at the same location within the same date range. If the related individual's contact information is out of date, the traveler needs to take the additional step 150 of figuring out the updated contact information. Once the step 140 of contacting the related individual is completed, the traveler can determine whether or not the related individual will be at the same location within the same date range. If so, the traveler can then take the step 170 of noting this and making arrangements to meet with the related individual.

The combination of a social network and an electronic location calendar enables travelers to easily discover which related individuals, if any, will be at the destination at the same time that the traveler will be. The traveler does not have to personally contact every friend, family member, business associate, etc., to discover this information as they would previously. Once the traveler discovers which related individuals will be in the same geographical proximity on a given date, the traveler can then contact those related individuals and make arrangements to meet.

The social network is an integral component for achieving the convenience above. There are several online social networks on the internet today, such as Friendster, Orkut, and Plaxo. An online social network allows an individual to easily keep track of relationships that the individual has with other people by leveraging the internet. Each individual maintains his or her own account profile on the online social network, and defines who his or her related individuals are. Once defined, the online social network retains the relationship.

FIG. 4*a*, FIG. 4*b*, FIG. 4*c*, FIG. 4*d*, and FIG. 4*e* represent relationship diagrams to provide a better understanding of online social networks. In this example, all relationships are symmetrical, meaning if User A 400 is a related individual of User B 410, then User B 410 must be a related individual of User A 400. An online social network need not have such a symmetrical relationship. In FIG. 4*a*, User A 400 defines his relationship with three related individuals, User B 410, User C 420, and User D 430. Each of these three related individuals have their own relationship to their own related individuals. The relationship diagram in FIG. 4b reveals User B's 410 related individuals. As shown, User B's related individuals are User A 400, User C 420, User E 440, and User F 450. FIG. 4c shows that User C's 420 related individuals are User A 400, User B 410, User F 450, and User G 460. FIG. 4d shows that User D's 430 related individuals are User A 400, User G 460, User H 470, User I 480, and User J 490. In FIG. 4e, User A's 400 related individuals are shown, with up to one degree of separation. User A's 400 related individuals at zero degree of separation include User B 410, User C, 420, and User D 430. User A's 400 related individuals at one degree of separation include User E 440, User F 450, User G 460, User H 470, User I 480, and User J 490.

The advantages of an electronic social network are numerous. An electronic social network is able to maintain a list of related individuals for a member. Since an electronic social network stores a relationship (or link) to a related individual from a member, data about a related individual is managed by the related individual. For example, the electronic social network keeps a link between User A and User B. If User A's phone number changes, there is no need for User B to make the update. User A updates his/her phone number on the electronic social network, and the update is automatically reflected to User B. Similarly, the electronic social network also has a link between User A and User C, and thus User C would also sees User A's new phone number. Another advantage of an electronic social network is the ability to see related individuals at multiple levels of separation. Users of the electronic social network can see friends of friends, or others within one degree of separation. Of course, viewing users at more than one degree of separation is also possible.

The other integral component for helping travelers stay in touch with friends, family, and associates is the electronic location calendar. The electronic location calendar builds upon the conventional electronic calendar. There are several electronic calendars in existence today, and they can be in the form of a desktop application or a web application. FIG. 2 shows an example of a conventional electronic calendar. As can be seen in FIG. 2, in this calendar view, the scope is one month, and is primarily displaying the month of May. A month view is equivalent to a five week view displayed in a grid format. In this grid format, the spacing between the horizontal and vertical lines do not need to be completely uniform. Each day in the calendar view has its own day container. In this example, each day container is essentially a square. The last day of April and the first few days of June can also be seen in this conventional electronic calendar 200. The user has the ability to scroll forward or backwards in time by clicking on the back scroll 220 or forward scroll 210. The scroll will usually scroll in increments of a week or a month. In addition to the calendar view having a scope of one month, showing a scope of one day, one week, two weeks, three weeks, four weeks, and so on are also possible.

The conventional electronic calendar is used for keeping track of events. Some example events are lunch appointments, meetings, birthdays, and trips. The conventional use for the electronic calendar is to record an event into the calendar so that the user is able to keep track of what appointments and commitments the user has for any given date. An event is entered with a start date and end date. It may also include a start time and end time if the event is not all day.

FIG. 3 provides a view of a conventional electronic calendar with four events entered by the user. The events shown in the conventional electronic calendar 300 as displayed as event overlays, and are "Meeting" 310, "Lunch" 320, "Camping with family" 330, and "Wedding" 340. The start time and end time are not displayed in this view, but could be. In this example view 300, the user may have a meeting with a co-worker at 3 pm on May $10^{th}$, and would enter it into the conventional electronic calendar. Once entered, it would appear graphically as an event overlay within the May $10^{th}$ day container as seen in the "Meeting" event overlay 310. The same user may have a lunch appointment with a friend at 12 pm on May $14^{th}$, which can be seen in the "Lunch" event overlay 320 within the May $14^{th}$ day container. The same user may be leaving for a camping trip with the family from May 18 until May 20, without specifying any start or end time. This is seen in the "Camping with family" event overlay 330 which spans across three day containers: May $18^{th}$, May $19^{th}$, and May $20^{th}$. Finally, the user may have a wedding to attend on May $27^{th}$ from 2 pm until 5 pm, and this is displayed as the "Wedding" event overlay 340 within the May $27^{th}$ day container.

An understanding of existing advertising technologies, along with an understanding of social networking and electronic location calendar technology will help to better understand the present invention and along with its many advantages in allowing advertisers to better target their advertisements.

SUMMARY OF THE INVENTION

The present invention provides a method and system for targeting advertisements to select individuals based on data entered by the individuals into an electronic location calendar. The raw data entered by the individuals into their respective electronic location calendar includes previous home locations, current home location, future home location, past trips, current trips, future trips, and additional meta-data for the multiple home locations and trips. Some example travel habits that can be derived include the percentage of time a traveler spent out of the country last year, the number of days a traveler spent at home, the number of times a traveler flew to New York, and the number of miles the traveler traveled regardless of the mode of transit. Through this invention, advertisements can be targeted to individuals based on these travel habits.

BRIEF DESCRIPTION OF THE DRAWINGS

A more complete appreciation of the invention and many of the advantages thereof will be readily obtained as the same becomes better understood by reference to the detailed description when considered in connection with the accompanying drawings, wherein:

FIG. 2 is a view of a conventional electronic calendar.

FIG. 3 is a view of a conventional electronic calendar.

FIG. 8 is a user interface diagram for inputting a user's future travel plans into an electronic location calendar system.

FIG. 9 is a view of an electronic location calendar.

FIG. 10 is a view for reporting the location of related individuals that can be met for a particular trip.

FIG. 16 is a user interface diagram for inserting and targeting an advertisement in an embodiment of the present invention.

FIG. 17 is a user interface diagram for inserting and targeting an advertisement in an embodiment of the present invention.

FIG. 18 is a user interface diagram for inserting and targeting an advertisement in an embodiment of the present invention.

FIG. 19 is a user interface diagram for displaying an advertisement in an embodiment of the present invention.

DETAILED DESCRIPTION OF THE PREFERRED EMBODIMENTS

Figure 6:
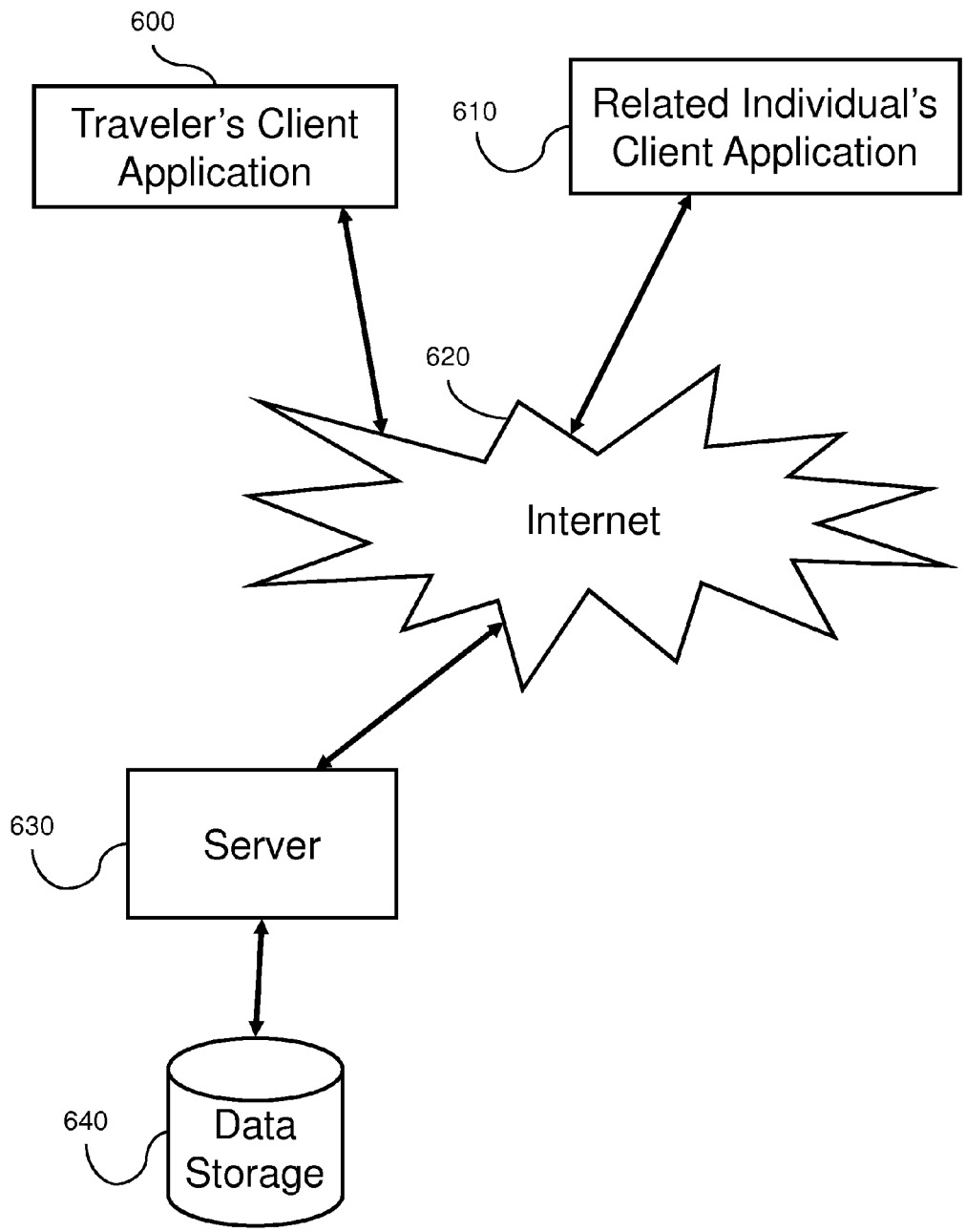
FIG. 6 is a technical block diagram of an electronic location calendar system

FIG. 6 is a high level technical diagram of a system for an electronic location calendar system. The electronic location calendar system combines an electronic location calendar with a social network. A traveler interacts with the electronic location calendar system by using a client application 600 which is connected to the internet 620 and communicates with the server 630. Similarly, one or more related individual of the traveler also uses a client application 610 which is connected to the internet 620 and communicates with the server 630. The server 630 contains application logic for inputting travel plans and using this data for advanced reporting. The server 630 is also used to manage all logic involved with an electronic social network. All persistent data is stored by the server 630 onto a data storage device 640 such as a database.

Figure 1:
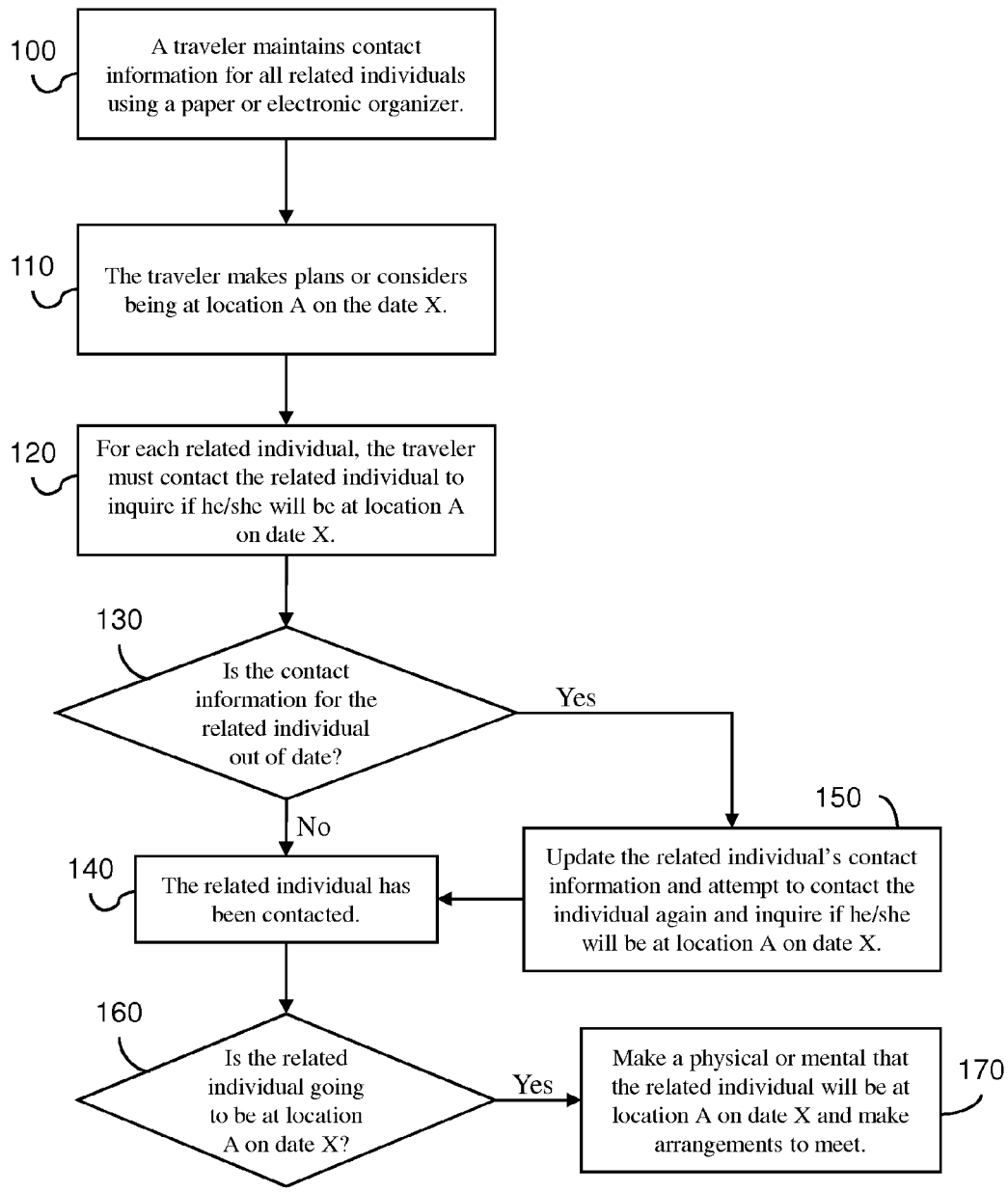
FIG. 1 is a flowchart diagram.
Figure 4A:
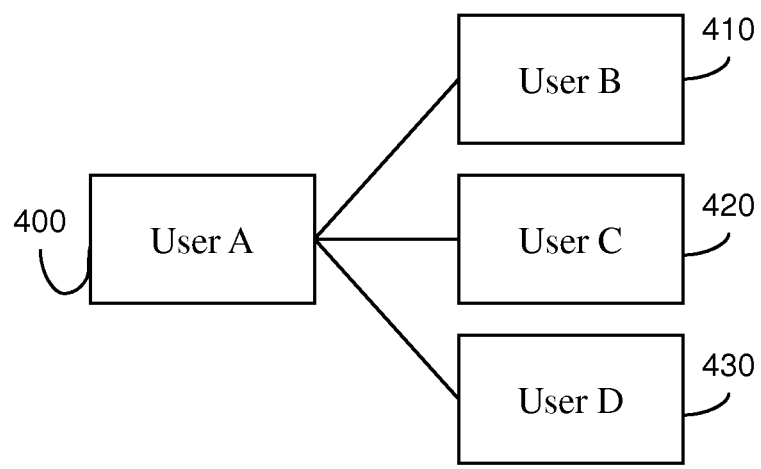
FIG. 4a is relationship diagram of an electronic social network.
Figure 4B:
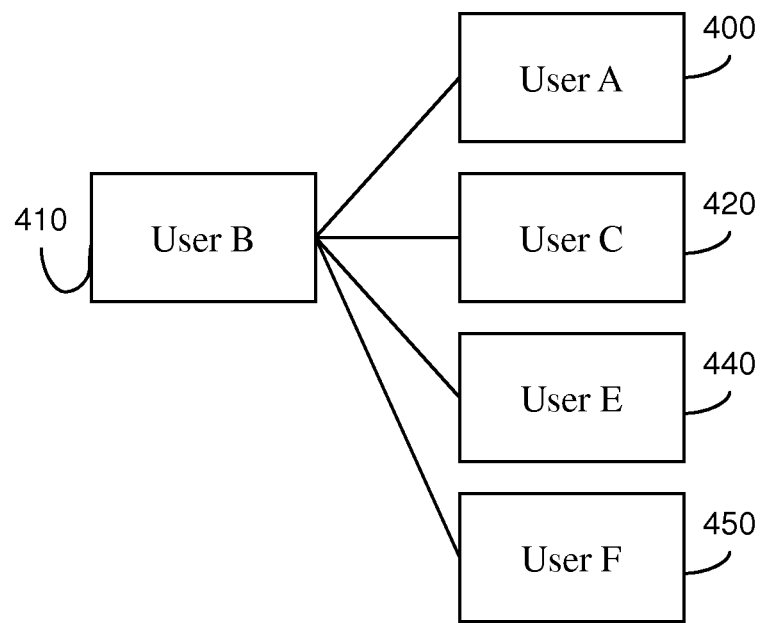
FIG. 4b is relationship diagram of an electronic social network.
Figure 4C:
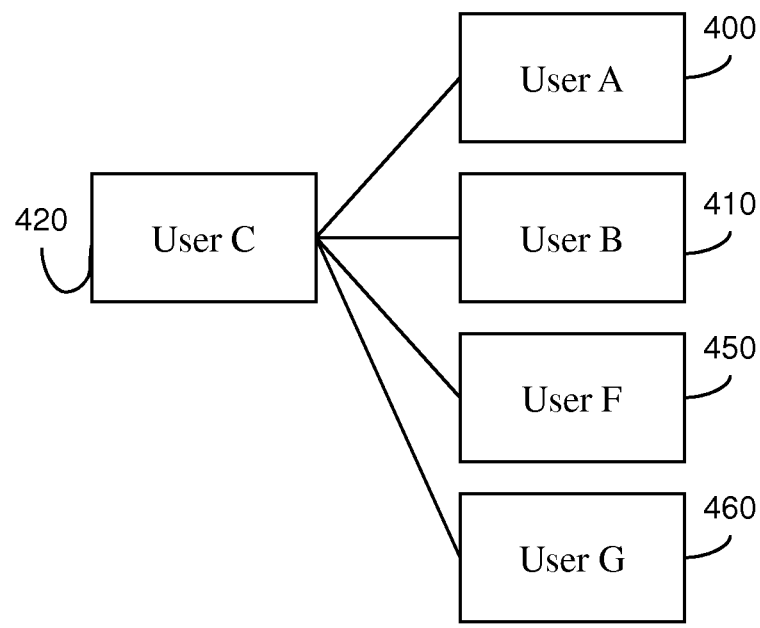
FIG. 4c is relationship diagram of an electronic social network.
Figure 4D:
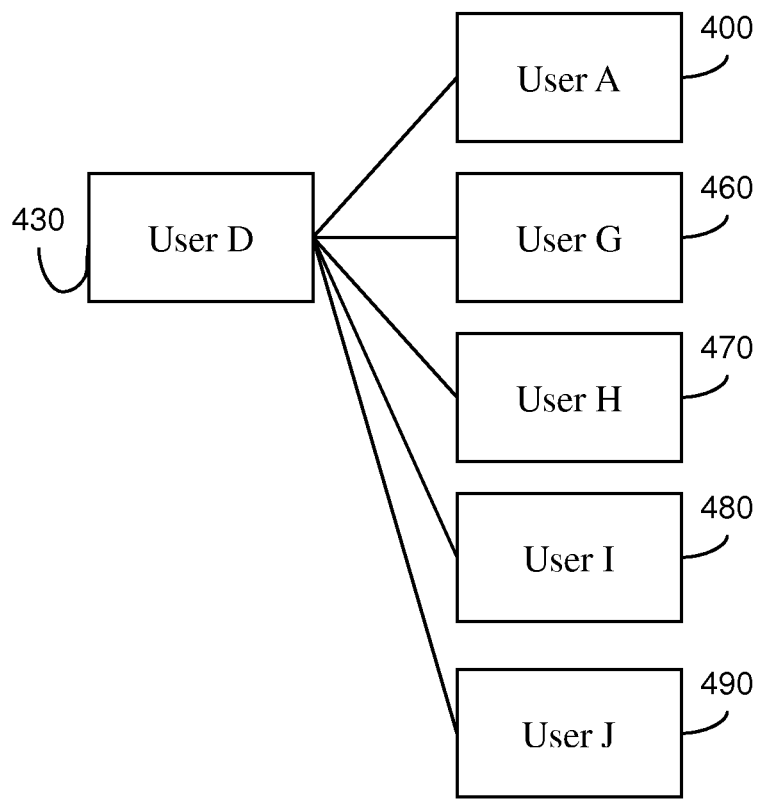
FIG. 4d is relationship diagram of an electronic social network.
Figure 4E:
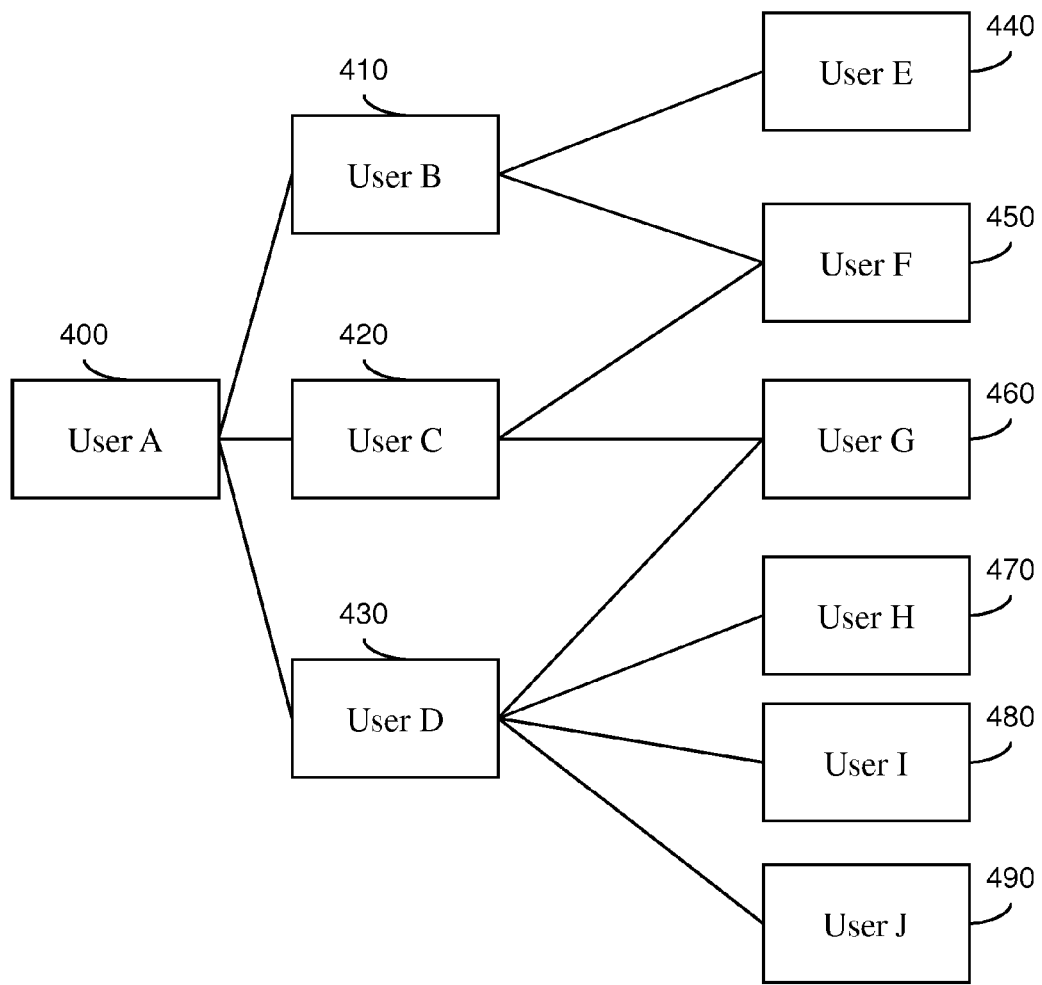
FIG. 4e is relationship diagram of an electronic social network.
Figure 5:
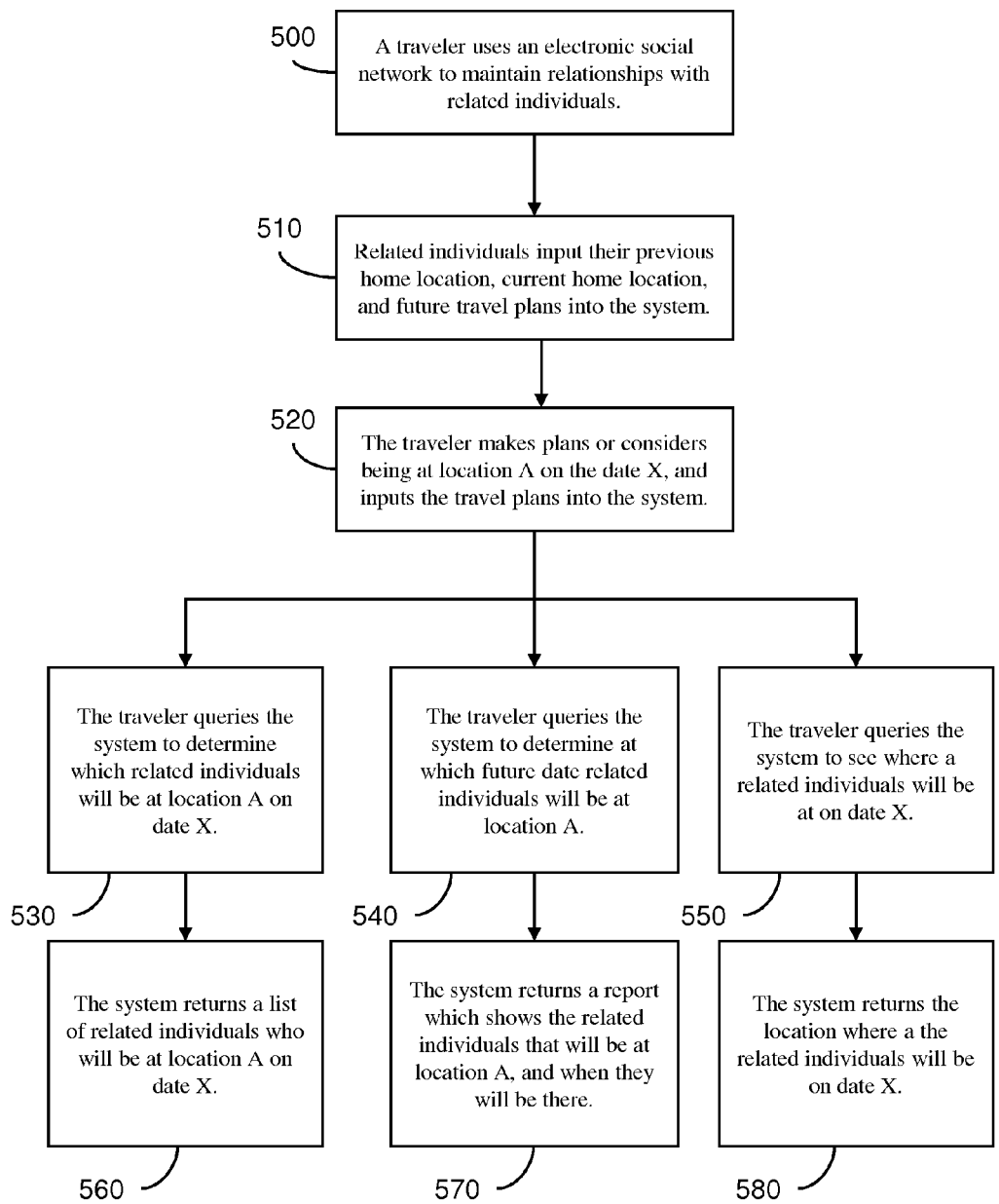
FIG. 5 is a flowchart diagram demonstrating how a user interacts with an electronic location calendar system.

FIG. 5 is a flow chart showing how travelers can better coordinate and stay in touch with related individuals using the electronic location calendar system. In the first step 500, a traveler uses a client application 600 to interface with an electronic social network running on the server 630 to maintain his/her relationship with related individuals. Data about the traveler and related individuals, along with their relationships are persisted in the data storage device 640. In the next step 510, related individuals, using a client application 610, input their previous home location, current home location, and future travel plans into the system, which ultimately gets registered by the server 630 and stored onto the data storage 640. Related individuals are able to add, remove, and edit future travel plans. Related individuals can also modify their current and previous home locations.

In step 520, the traveler makes plans to travel or is considers traveling. The traveler's destination or intended destination, if any, is designated as location A on the date X. The traveler enters this information into the system via the client application 600.

With travel plans in mind, the traveler may be curious about which related individuals he/she can meet with while at location A. In the electronic location calendar system, the traveler is able to query for this information in three different fashions. First is via step 530 whereby the traveler queries the system to determine which related individuals will also be at location A on date X. In step 560, the electronic location calendar system returns a list of all related individuals who will be at location A on date X. The system will return an empty list if it cannot find any related individuals that will also be at location A on date X.

The second means by which the traveler can query the electronic location calendar system is via step 540 whereby the traveler queries the electronic location calendar system to discover when in the future related individuals will be at location A. If the traveler is flexible, the traveler will be able to use this information to influence when the traveler decides to travel to location A. In step 570, the electronic location calendar system returns a report revealing the related individuals who will be at location A sometime in the future, and the dates when they will be at location A.

The third means by which the traveler can query the electronic location calendar system is via step 550 whereby the traveler queries the electronic location calendar system to see where related individuals will be on date X. This allows the traveler to see where the traveler's related individuals will be for a future date. In step 580, the electronic location calendar system returns with information revealing the location of related individuals for date X. This can be displayed in a list format or can be displayed on a map for easier viewing.

FIG. 6 shows at a high level how the users interact with the electronic location calendar system, and how different pieces of the electronic location calendar system are interconnected. The traveler interacts with the electronic location calendar system via a client application 600, and similarly, the related individuals interact with the electronic location calendar system via a client application 610. The traveler's client application 600 and related individuals' client application 610 both connect to a server 630 by going over the internet 620. The server 630 uses a data storage device 640 for data persistence.

Figure 7:
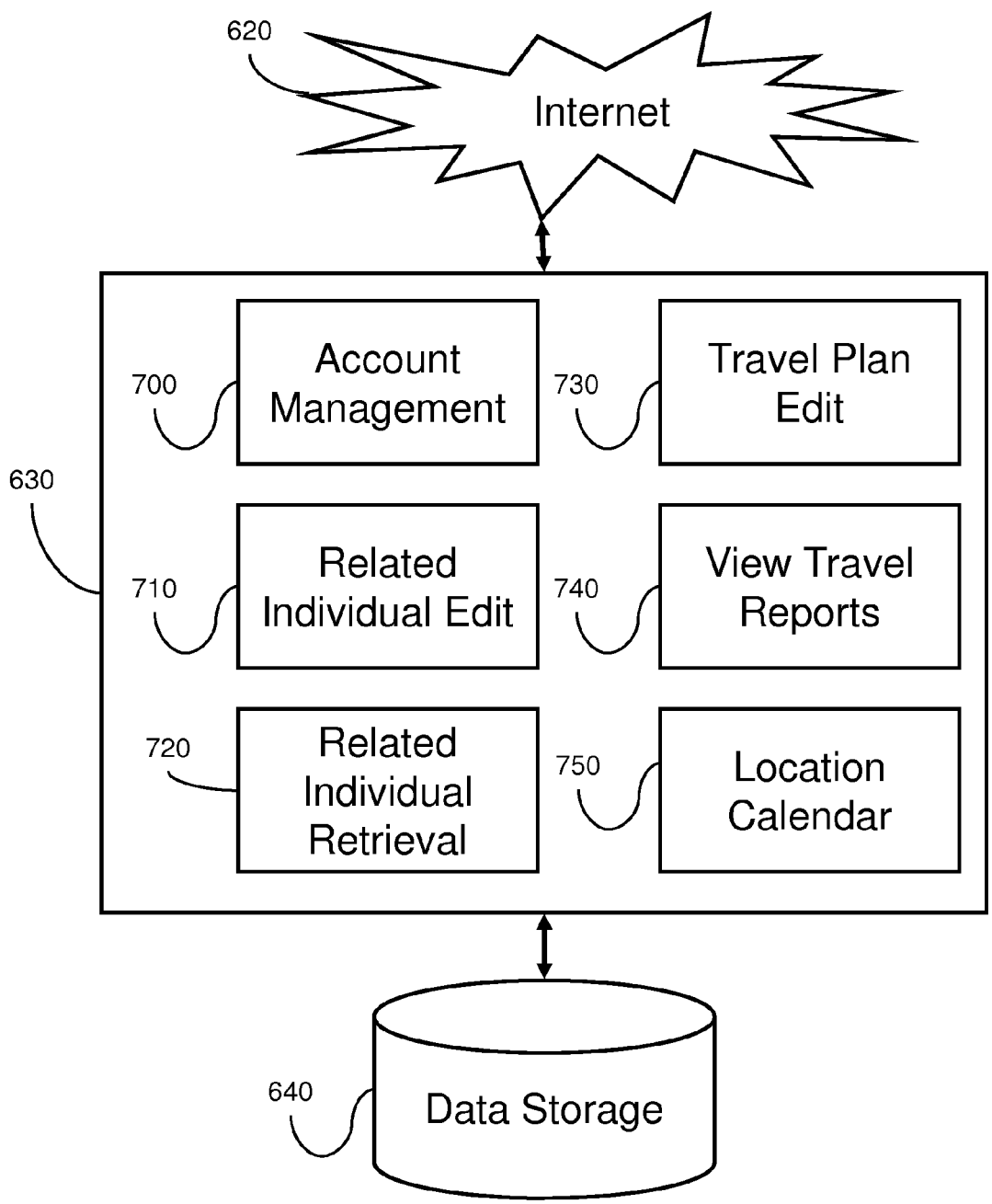
FIG. 7 is a detailed technical block server diagram of an electronic location calendar system.
Figure 11:
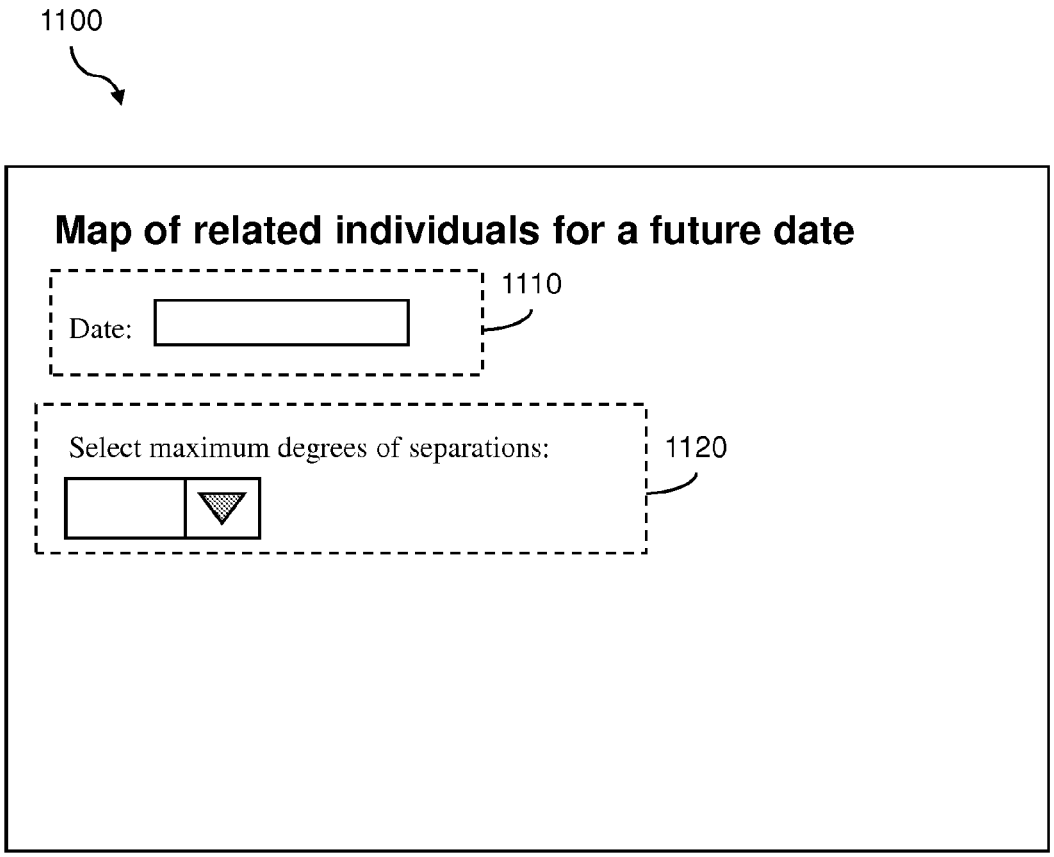
FIG. 11 is a user interface diagram for querying the location of related individuals for a particular date.

FIG. 7 is a detailed technical diagram of the electronic location calendar system. The server 630 contains several modules where business logic resides for handling an electronic social network and for handling travel related functions. The business logic modules responsible for the electronic social network include Account Management 700, Related Individual Edit 710, and Related Individual Retrieve 720. The modules responsible for the travel related functions include Travel Plan Edit 730, View Travel Reports 740, and Location Calendar 750.

The Account Management module 700 is used to manage basic account features for each member of the electronic social network. Basic account features include creating a new account, modifying an existing account, logging into an existing account, and removing an existing account. Some properties of an account include username, password, first name, last name, address, phone number, photos, interests, work information, email address, and credit card information. In terms of location, the account may also hold previous home location(s) data and current home location data. There may be multiple previous home location data for a user. For example, a user may have lived in Los Angeles, Calif. from Jan. 10, 1986 until Mar. 20, 1997, and San Francisco, Calif. from Mar. 21, 1997 until Sep. 5, 2006. There is a single current home location data for a user. For example, a user may have a current home location of Seattle, Wash., starting from Sep. 6, 2006. There may also be future home locations, if the user knows that he/she will be moving to another location in the future. Anytime a user performs account related functionality, it is the responsibility of the Account Management module 700 to handle the request. Account information is persisted on the data storage 640.

The Related Individual Edit module 710 allows a member of the electronic social network to add a relationship to a related individual, edit a relationship to a related individual, and remove a relationship to a related individual. Typically, in order to have a relationship to a particular related individual on the electronic social network, that particular related individual must be a member and have an account set up with the electronic social network. The electronic social network member uses the Related Individual Edit module 710 to manage only related individuals within zero degree of separation from the member. The electronic social network member need not manage related individuals within degrees of separation of one or more, as this is handled by the system automatically. Relationships to a related individual are persisted on the data storage 640.

The Related Individual Retrieval module 720 handles the request of returning a list of related individuals for a particular member. The request may specify the degrees of separation. For example, a social network member may request all related individuals within zero degree of separation, which would prompt module 720 to return all related individuals for which the social network member has a direct relationship with. In another example, a social network member may request all related individuals within one degree of separation, which would prompt module 720 to return all related individuals for which the social network member has a direct relationship with, along with all related individuals that they have a direct relationship with.

The Travel Plan Edit module 730 allows a member of the social network to add a travel plan, edit a travel plan, and remove a travel plan. A travel plan includes properties such as the beginning date and time, ending date and time, destination, and purpose of travel. It may also include a specific event that the user is attending, such as a concert, tradeshow, conference, or other group activities. This data could be used for allowing users to discover each other that are attending the same event. A travel plan may also include transit information. For example, if the traveler is flying to the destination, the traveler may also enter information about the flight, including airline, flight number, departure date and time, departure airport, arrival date and time, and arrival airport. This would be entered once for the transit to the destination, and again for the transit back home. If the traveler is visiting multiple destinations, the traveler may enter multiple destinations, and accordingly, multiple transit information. All travel plan data is persisted on the data storage 640 connected to the server 630.

The View Travel Reports module 740 is responsible for handling various requests related to discovering the location of a related individual for a future date. There are three major types of request that the module 740 can accept. First is a request for all related individuals at a specified location for a specified date. Second is the location of related individuals for a specified date. Third is the future date when a related individual will be at a specified location.

The Location Calendar module 750 is responsible for putting a user's travel plans into a graphical, electronic location calendar. The location calendar will display a user's location for the past, present and future, and will utilize data collected by the Travel Plan Edit module 730. The information includes travel plans, previous home location(s), and current home location. The Location Calendar module 750, using complex algorithms, will utilize this information to determine where the user is at any point in time. Logically, the user cannot be in two different locations at the same date and time. For example, Location Calendar module 750 will intelligent know that the user is at the current location for a future date and time, unless there is a travel plan that takes the user somewhere else. If there is transit information for the travel plan, the Location Calendar module 750 will realize that during transit, the user is not in any particular location. On a side note, for transit, the system could discover a related individual on the same transit and inform the user of this.

FIG. 8 shows a user interface to enter their future travel plans. This user interface would be displayed on the traveler's client application 600 or the related individuals' client application 610. The traveler and related individuals are able to enter their future travel plans using this interface, which accomplishes step 510 and step 520. On this user interface 800, users can enter the date and time range 810 for their future travel plan, the location where they will be traveling to 820, plus the transit information 850 860. Travel location can be entered using a variety of information, such as city, state, and country, or zip code, or even the longitude and latitude as seen in 820. Transit information can be entered for the transit to the destination 850 and transit returning from the destination 860. In addition to capturing the transit start date/time, end date/time, departure airport, and arrival airport, other data such as the airline, flight number, and such could also be collected. Transit does not necessarily have to be an airline flight, and as such, other data could also be collected which would be relevant to travel by train, boat, or other means.

In user interface 800, the purpose for travel 830 is also selectable, and a name 840 can be assigned to each travel plan entered.

Privacy is also a very important consideration. Often times, a user may not want to disclose a particular travel plan, previous location, or current location to certain people. In order to protect the user's privacy, the system will allow the user to specify the privacy setting at a very granular level. In this embodiment, the privacy settings include: public, system member, extended network, immediate network, and specific categories within the immediate network. Public means the information is viewable by anyone. System member means that the information is viewable only by others who have an account on the system. Extended network means the information is viewable only by related individuals who are at most 1 degree of separation apart. Immediate network means the information is viewable only by related individuals who are 0 degrees of separation apart. Finally, categories within the immediate network means the information is viewable only by a subset of the immediate network. For example, the user is able to categorize related individuals within his/her immediate network as "Friends", "Family", or "Co-Workers".

The user is able to specify a privacy setting for each individual trip. For a user's trip to New York, the user may only want "Friends" and "Family" members to see this trip, whereas for a trip to Chicago, the user may allow the entire public to see this trip. The user is also able to specify a privacy setting for the previous and current home location.

Based on the travel plan data entered by the user in FIG. 8, and the data collected about the user's previous home locations and current home location by the Account Management module 700, the Location Calendar module 750 is able to draw a graphical representation of the user's location via an electronic location calendar 900. FIG. 9 shows an electronic location calendar for a particular user in the month of May. As can been seen, the electronic location calendar draws the calendar itself much like a convention electronic calendar would. The primary difference is that the electronic location calendar will has specialized logic to properly draw location overlays.

There are multiple types of location overlays. In this embodiment, four types of location overlays are described, which include home location overlay, destination location overlay, empty location overlay, and transit location overlay. Home location overlay is used to represent the location of the user based on the previous home location and current home location. The destination location overlay is used to represent the location of the user when the user is traveling. An empty location overlay is utilized when the system is unable to determine the location of the user for any period in time. Transit location overlay is used to represent the time when the user is in transit for travel.

In the example on FIG. 9, let's assume that today is May 28$^{th}$. The user specified a previous home location of San Francisco, Calif. from January 15$^{th}$ until 15$^{th}$ at 11 pm. So on the electronic location calendar 900, we see San Francisco, Calif. 910 as a home location overlay. On the electronic location calendar 900, the San Francisco, Calif. home location overlay 910 spans across a range of visible day containers, specifically, April 30$^{th}$ to May 15$^{th}$. Although the user's previous home location of San Francisco, Calif. spans from January 15$^{th}$ until May 15$^{th}$, the electronic location calendar 900 can only display the home location overlay 910 for the visible dates. Thus, only visible day containers, April 30$^{th}$ through May 15$^{th}$, will show the San Francisco, Calif. home location overlay 910. The user also specified that the user's current home location is Seattle, Wash., and that the user has been at this home location starting at 2 pm on May 17$^{th}$. This is represented graphically in the Seattle, Wash. home location overlay 930. As can be seen on the calendar, the system does not know where the user was between May 15$^{th}$, 11 pm and May 17$^{th}$, 2 am. This is referred to as dead-time, and graphically represented with an empty location overlay 920. Since the user's current home location is Seattle, Wash., the system assumes that this will be the user's home location in the future as well.

The user entered two travel plans. One which is now in the past (prior to May 28$^{th}$), and one that is in the future (after May 28$^{th}$). The first travel plan has a destination of Los Angeles, Calif., from May 24$^{th}$ at 6 am until May 25$^{th}$ at 10 pm. We see this in the Los Angeles, Calif. destination location overlay 940. The user did not specify any transit information for this travel plan. The second travel plan has a destination of New York, N.Y., with a start date/time of May 29$^{th}$ at 11 pm and end date/time of June 2$^{nd}$ at 12 am. We see this in the New York, N.Y. destination location overlay 970 which spans across three day containers, May 30$^{th}$, May 31$^{st}$, and June 1$^{st}$. In this second travel plan, the user has entered transit information for going to the destination and returning from the destination. The user is in transit to the destination from May 29$^{th}$ at 11 pm until May 30$^{th}$ at 5 am, which is shown in the transit location overlay 950. The user is in transit from the destination, returning back home, from June 1$^{st}$ at 7 pm until June 2$^{nd}$ at 12 am, which is shown in the transit location overlay 960. This means the user is at the destination, New York, from May 30$^{th}$, 5 am until June 1$^{st}$, 7 pm, as seen in the New York, N.Y. destination overlay 970.

In the sample electronic location calendar 900, each day container is assumed to be vertically partitioned into twenty four hours. This allows for display of location overlays to be vertically shifted by time. For example, the May 30$^{th}$ date cell shows a destination of New York, N.Y. starting at 5 am. This is expressed by starting the New York, N.Y. destination location overlay 970 about 5/24 or about 21% to the right of the left edge of the May 30$^{th}$ date cell. If the New York, N.Y. destination location overlay 970 was supposed to begin at 12 pm on May 30$^{th}$, it would be drawn as starting right in the center of the May 30$^{th}$ date cell, since 12/24 is 50%. This method provides the viewer with a quick approximate visual of the time.

In this electronic location calendar 900, all dates and times are displayed using a single, default time zone. This helps to avoid confusion and overlap of location overlays. To make it more convenient for the user to enter information such as transit start date/time, transit end date/time, travel plan start date/time, and travel plan end date/time, the system may allow the user to specify the time zone for the date/time entered, and the system can convert the entered date/time into the default time zone for display on the electronic location calendar. It is advantageous for the system to keep the entered time zone specified by the user for future display purposes, such as when the user decides to make an edit to an existing travel plan.

Also notice that the system recognized that the Seattle, Wash. home location overlay 930 had to be segmented because of the user's travel to Los Angeles, Calif. and New York, N.Y. As visually displayed in the Seattle, Wash. home location overlay 930, the user is not in Seattle, Wash. while in transit or at a travel destination. There are four possible outcomes with a home location overlay is segmented by a travel plan. The home location overlay may result in zero segments, meaning that a travel plan ranges all dates that the home location overlay does. In other words, the start date/time for the travel plan is equal to or earlier than the start date/time for the home location overlay, and the end date/time for the travel plan is equal to or later than the end date/time for the home location overlay. The home location overlay may result in one segment, with the start date/time set to a later date/time than the original home location overlay. This happens when the travel plan start date/time is less than or equal to the home location overlay start date/time, the travel plan end date/time is later than the home location overlay start date/time, and the travel plan end date/time is earlier than the home location overlay end date/time. The home location overlay may result in one segment, with the end date/time set to an earlier date/time than the original home location overlay. This happens when the travel plan start date/time is later than the home location overlay start date/time, the travel plan start date/time is earlier than the home location overlay end date/time, and the travel plan end date/time is later than or equal to the home location overlay end date/time. Finally, the home location overlay may result in two segments. This happens when the travel plan start date/time is later than the home location overlay start date/time and the travel plan end date/time is earlier than the home location overlay end date/time.

In step 530, the traveler is able to discover related individuals who will be in the same future location at the same future date and time. This can be easily done by clicking on the destination of a travel plan on the electronic location calendar 900. As mentioned, the user is traveling to New York, N.Y. The user can click on this destination 970 on the electronic location calendar 900, and the system will search for all related individuals that will be near New York, N.Y. between May 30$^{th}$, 5 am, and June 1$^{st}$, 7 pm. This list is shown on FIG. 10. The traveler is also able to specify the maximum degrees of separation to search for via the drop down 1040. For example, if the traveler chooses "0" as a selection here, the system will limit search results to only related individuals with zero degrees of separation from the traveler. The traveler is also able to specify the maximum distance a related individual can be from the traveler by entering the maximum distance in the drop down 1050. The search result includes the related individual's name 1010, along with the location where the related individual will be located 1020. The search result also shows the specific future dates 1030 for when these related individuals will be in location specified in 1020. This search result satisfies step 560.

Another way of searching is by date rather than by destination. The user can click on a particular date on the electronic location calendar 900 and see which related individuals will be nearby on that given date. For example, the user may click on May 8$^{th}$. Although this is in the past, the functionality will be the same. By clicking on May 8$^{th}$, the system will recognize that the user was in San Francisco, Calif. on that date, and will show the user a list of related individuals who were nearby to San Francisco, Calif. on that date.

Figure 12:
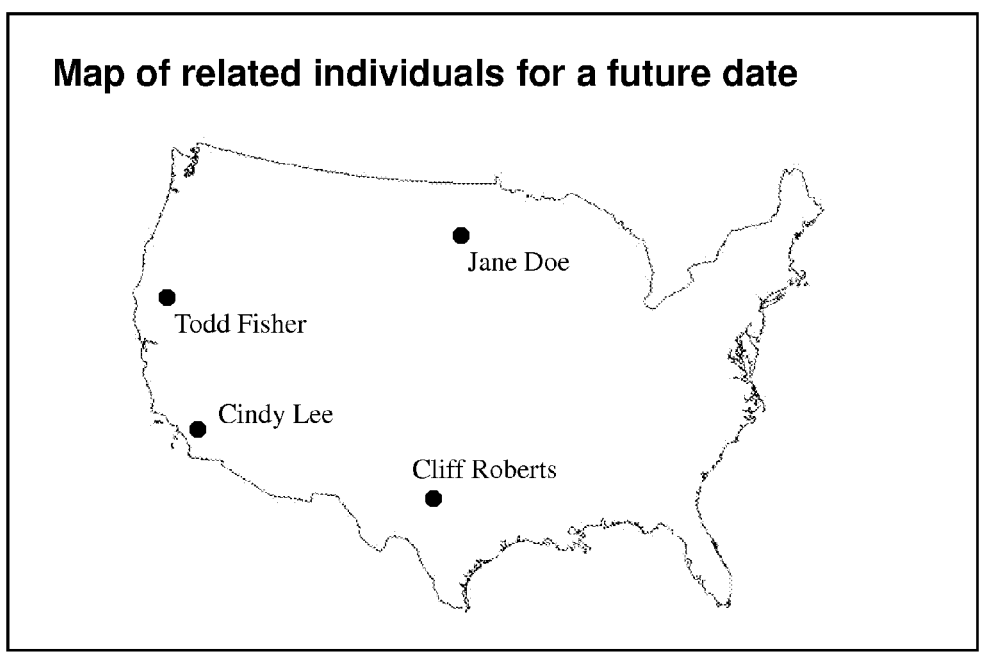
FIG. 12 is a map view for reporting the location of related individuals.

In step 550, the traveler is able to query the system to see where related individuals will be on a future date. One method of doing so is by simply viewing the related individual's electronic location calendar. Another method is via user interface 1100 which allows the traveler to specify a future date 1110, and the maximum degrees of separation 1120. FIG. 12 shows a graphical search result for the query submitted from user interface 1100. FIG. 12 shows where each related individual will be for the future date specified. Each related individual is plotted on a map, which provides a much more user friendly view for the traveler. The map may be customized to show the entire globe, or to be zoomed into one geographical area. This search result satisfies step 580.

With this electronic location calendar system, a traveler is given the opportunity to efficiently schedule meetings and get together with related individuals. These related individuals, as mentioned earlier, may be friends, co-workers, business associates, relatives, etc. The advantage of being able to meet with a related individual while traveling may be advantageous from a business viewpoint, and may also make the travels more enjoyable. In many cases, travelers will find themselves scheduling their travel plans around their related individuals' travel plans. The electronic location calendar system allows for this capability as well. With this electronic location calendar system, travelers will no longer have to miss an opportunity to meet and get together with related individuals. With this electronic location calendar system, travelers will no longer waste time seeking related individuals when planning to travel.

In addition to providing value for the user of an electronic location calendar, the data collected within an electronic location calendar provides immerse targeting capabilities for an advertiser.

Figure 13:
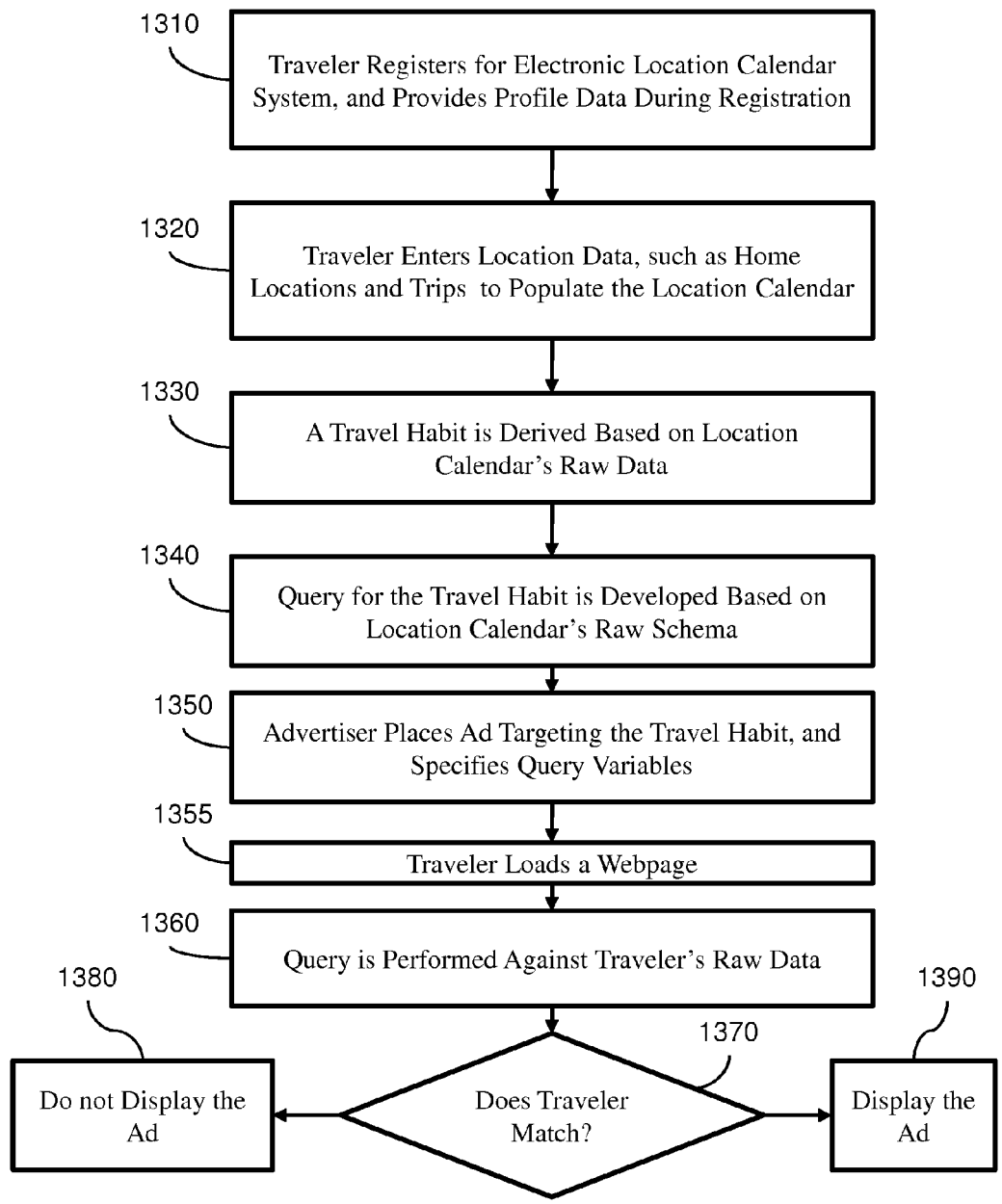
FIG. 13 is a flowchart diagram of an embodiment of the present invention.
Figure 14:
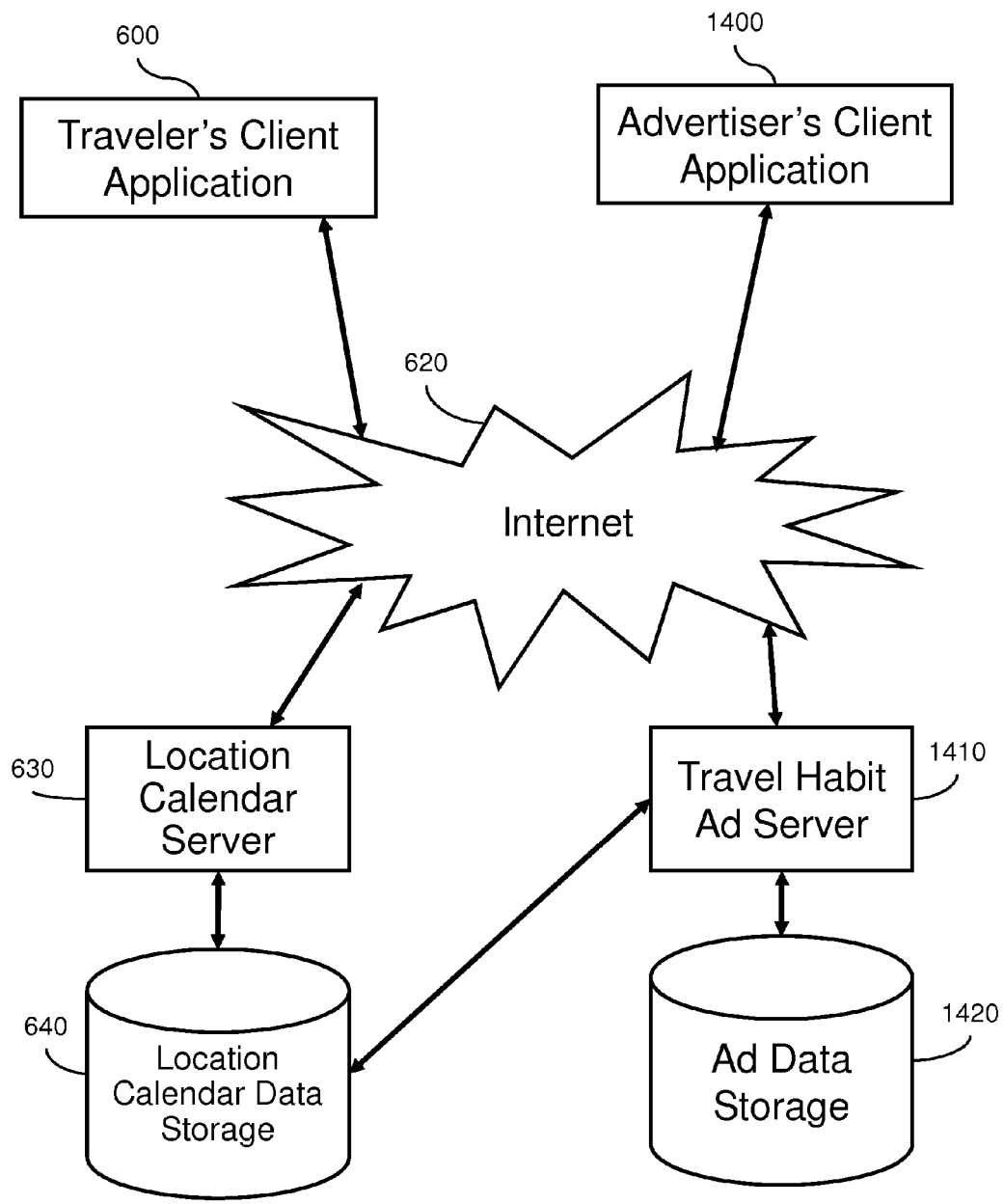
FIG. 14 is a technical block diagram of an embodiment of the present invention.

FIG. 13 shows a flowchart describing steps for targeting an advertisement to a traveler, based on the traveler's travel habits. As has been described, in steps 1310 and 1320, the traveler registers for an electronic location calendar system, and provides travel related data to the electronic location calendar system. The data entered by the user during registration and any travel related data is considered raw data. FIG. 14 shows a technical block diagram, showing how the traveler interacts with the location calendar system in relation to the advertising system of the present invention.

In step 1330, a travel habit is derived based on the raw data available about the traveler within the electronic location calendar system. A sample derived travel habit is the number of times a traveler travels between airport X and airport Y between a start date and end date. The variables in this sample derived travel habit include: 1) number of times, 2) airport X, 3) airport Y, 4) start date, and 5) end date. These variables will ultimately be defined by the advertiser. Once the travel habit is derived in step 1330, the next step 1340 is to develop a query in a computer query language such as SQL, to be able to execute the match. The set of derived travel habits, and its meta-data such as the query, is maintained and managed by the Travel Habits Manager 1510 within the Travel Habit Ad Server 1410.

Figure 15:
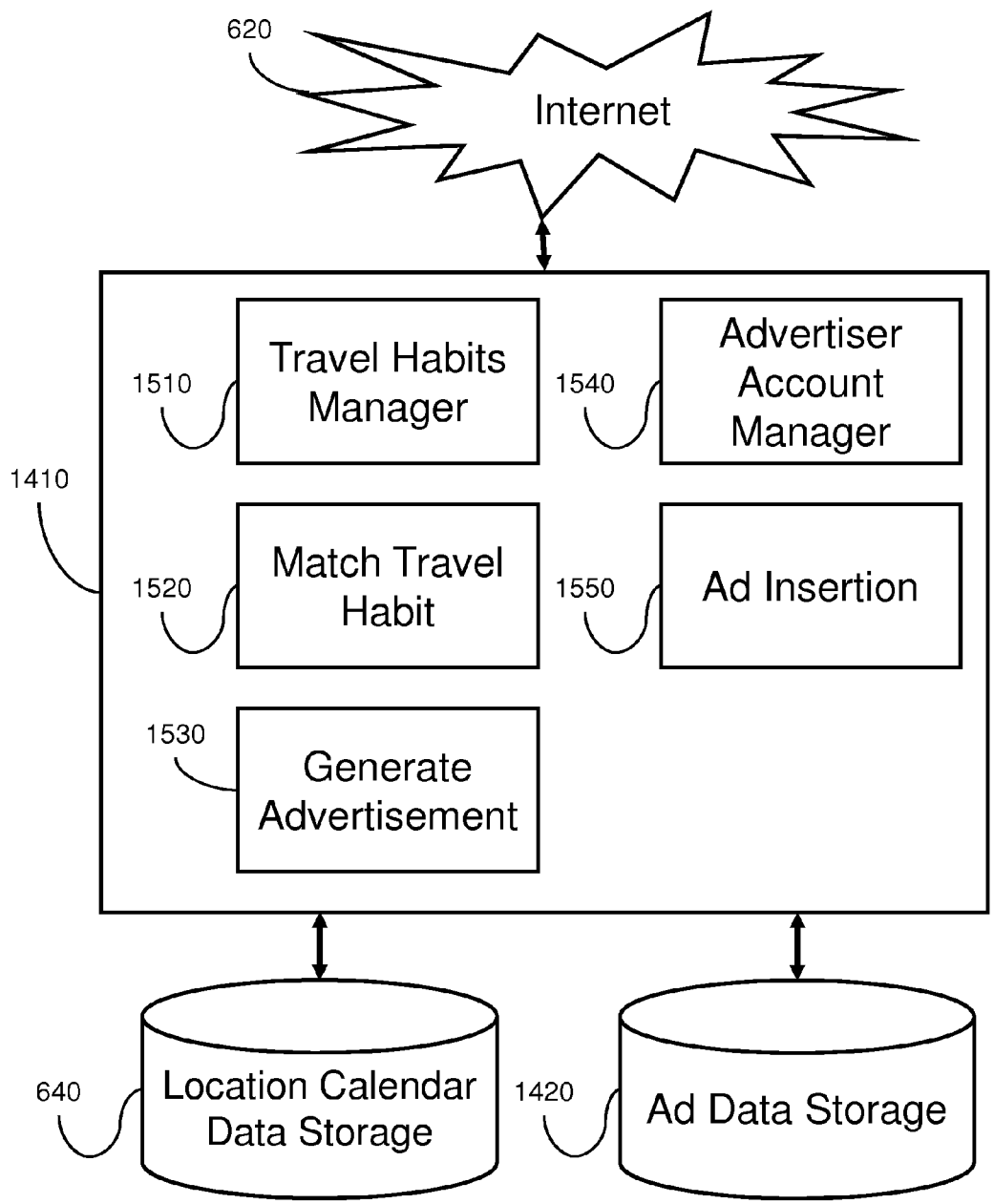
FIG. 15 is a detailed technical block diagram of an embodiment of the present invention.

Now that one or more derived travel habits have been defined in the system, an Advertiser is now able to interface with the system of the present invention, using Advertiser's Client Application 1400, to perform the step 1350. The Advertiser's account on the system of the present invention is managed by the Advertiser Account Manager 1540. In step 1350, the Advertiser inserts a new advertisement into the system of the present invention targeting a derived travel habit and specifying any related variables. FIG. 16, FIG. 17, and FIG. 18 provide three example user interface diagrams that the Advertiser would use to insert a new advertisement into the system targeting different derived travel habits. The Ad Insertion component 1550 is responsible for handling the insertion of new advertisements from the Advertiser. Information about the Advertiser and Advertisements may be persisted in a separate database from the Electronic Location Calendar system, as is demonstrated in FIG. 15. As shown in FIG. 15, the Travel Habit Ad Server 1410 has access to both the Location Calendar Data Storage 640 and Ad Data Storage 1420.

In FIG. 16, FIG. 17, and FIG. 18, it can be seen that the Advertiser also enters general information and information about the display of the advertisement. Advertisement display information 1620 includes the Ad Title, URL, and short description. All of this data will ultimately be used for displaying the advertisement to the targeted traveler.

In FIG. 16, the Advertiser has opted to target the derived travel habit "Flight Route Frequency" as seen in the Travel Info section 1630. In FIG. 17, the Advertiser has opted to target the derived travel habit "Miles Traveled for Work" as seen in the Travel Info section 1730. In FIG. 18, the Advertiser has opted to target the derived travel habit "# of Days In City for Travel" as seen in the Travel Info section 1830. For each derived travel habit, the CPM, which is the price per thousand impressions, can vary. The price variance may be based on many factors. These factors may include the popularity of the derived travel habit, overall demand to reach the specific travelers who match the targeted travel habit, and the value of the variable fields entered by the Advertiser. Other pricing models may also be used, such as CPC (cost per click).

As seen in FIG. 16, FIG. 17, and FIG. 18, the variable fields differ depending on the derived travel habit chosen. This data is maintained by the Ad Insertion component 1550. In FIG. 16, the derived travel habit "Flight Route Frequency" includes the Advertiser definable variables: a) Airport X, b) Airport Y, c) the minimum number of times the traveler must have traveled between Airport X and Airport Y, d) the start date, and e) the end date. For example, the Advertiser may fill in section 1630 to state the desire to target travelers who traveled between LAX and JFK at least 20 times between Jan. 1, 2007 and Jul. 1, 2007. FIG. 17 and FIG. 18 show other variables that are associated to their respective derived travel habits. Once the advertiser chooses one of the derived travel habit and fills out the variables associated to the derived travel habit, this data is stored in the Ad Data Storage 1420 and collectively, this data is referred to as the targeted travel habit.

In step 1355, when the traveler requests a webpage, a query will be performed in step 1360 to determine whether the traveler matches the targeted travel habit by the Advertiser. This logic is handled by the Match Travel Habit component 1520. To make the determination as to whether or not the traveler matches the targeted travel habit in step 1370, the Match Travel Habit component 1520 will query the raw data for the traveler contained in the Location Calendar Data Storage 640.

As an example, let's take a look at how the query would work for the derived travel habit labeled "# of Days In City for Travel" as seen in user interface diagram 1800. The query needs to determine if the traveler has been within a specified radius of a particular location for at least a specified number of days, in between a specified start date and end date. As already noted, this query will utilize the traveler's raw data to make this determination. The query will specifically need to look at the travel plans data within the raw data, and is not interested in the home location data. For all travels plans between the specified start date and end date, the query will need to see if the destination for the travel plan is within the specified radius. This is performed using longitudinal and latitudinal distance algorithms. For each destination that is within the specified radius, the number of days at the destination will need to be tallied. If the number of tallied days is greater than the specified number of days, then there is a match. In this example, only a subset of the traveler's raw data was required for the query. Other data available, such as the traveler's transit and home location (previous, current, and future), were not required.

It may be beneficial to employ some type of caching algorithm or search engine to optimize the performance of the system. For example, a targeted travel habit may be queried in batch against all travelers in the Location Calendar Data Storage 640, and a flag can be maintained for each traveler to denote whether the traveler matches the targeted travel habit. This avoids the need to perform a cumbersome query in real-time every time an advertisement needs to be served to the traveler.

If there is not a match to a particular targeted travel habit, then the associated advertisement is not displayed, as seen in step 1380. If there is a match, then the associated advertisement may be displayed to the traveler, as seen in step 1390. The Generate Advertisement component 1530 is responsible for composing the advertisement and serving it to the webpage being viewed by the traveler. An example of advertisements displayed to the user is displayed in user interface diagram 1900. The user interface diagram 1900 shows a page that the traveler will use to view his/her travel calendar. Above the travel calendar are advertisements 1910. Three advertisements are shown in the advertisement section 1910. The first advertisement, titled "Fly ABC Airlines" is targeted towards travelers who have traveled between LAX and JFK at least 10 times between Jan. 1, 2007 and Jul. 1, 2007, which matches the logged in fictitious traveler, John Doe. The second advertisement, titled "New York Restaurants" is targeted towards travelers who will travel to New York within the next two weeks, which matches logged in fictitious traveler, John Doe. The third advertisement, titled "Save a Trip" is targeted towards travelers who traveled at least 10,000 miles within the past 3 months for business, regardless of the type of transit utilized, which matches logged in fictitious traveler, John Doe.

A few more examples of derived travel habit include targeting the day of the week a traveler is at a particular location, targeting travelers who spend at least a specified number of hours on a train for a specified start date and end date, targeting travelers who switch home locations at least a specified number of time within a specified start date and end date, targeting a traveler who has attended at least a specified number of conferences within a specified start and end date, and targeting a traveler who was on at least a specified number of flights within a specified start date and end date.

In addition to the derived travel habits described above, it is also possible to target advertisements to derived travel habits of related individuals. A derived travel habit of related individuals uses raw data entered by the traveler's related individuals. For example, the traveler may have ten friends, out of which, eight are traveling to New York next week. An advertiser may wish to take advantage of this information by targeting a discount airfare to the traveler for next week. To do so, the advertiser would target the ad to a derived travel habit of related individuals since the targeting is based on the raw data from the traveler's related individuals. The methodology for targeting a derived travel habit of related individuals is more or less identical to the logic methodology for targeting a derived travel habit, except it is inclusive of raw data from the traveler's related individuals.

These are just a few examples of the powerful targeting that can be derived from the raw data in the Location Calendar System. It has now been demonstrated how, with the present invention, advertisers can greatly benefit and target based on derived travel habits and derived travel habits of related individuals.

Although the present invention has been described in detail with respect to certain embodiments and examples, variations and modifications exist which are within the scope of the present invention as defined in the following claims.

What is claimed:

1. A computer-implemented method, comprising:
  receiving, at a server hosting an electronic social network over an Internet, a future travel plan indicating departure and destination locations and dates for a future trip planned by a traveler;
  storing the future travel plan in a database storage device coupled to the server;
  storing a profile associated with the traveler in the database storage device coupled to the server indicating travel habits of the traveler based on previous travel plans of the traveler received at the server;
  determining a targeted travel habit for the traveler based on the future travel plan of the traveler and the profile of the traveler;
  receiving, at the server over the Internet, a future travel plan for a related individual, wherein the related individual is related to the traveler by no more than one degree of separation through the electronic social network;
  storing the received future travel plan for the related individual in the database storage device accessible by the server, wherein the received future travel plan for the related individual specifies a future trip planned by the related individual including the travel departure and destination locations and associated dates for the related individual's future trip;
  determining, by a data processing system, matching trips for the traveler and the related individual whom are related by no more than one degree of separation on the electronic social network, and wherein the matching trips for the members of the electronic social network is determined by: (1) the traveler and related individual having a matching destination in their future travel plans, wherein a matching destination is a travel destination for the related individual specified in the received future travel plan for the related individual matching a travel destination specified in the future travel plan for the traveler, and (2) the traveler and related individual have a matching date for the matching destination in their future travel plans, wherein a matching date is a date specified in the received future travel plan for the related individual for the matching destination matching a date specified in the future travel plan for the traveler for the matching destination;

associating an advertisement to the traveler, wherein the advertisement is associated to the traveler based on (i) the traveler's targeted travel habit (ii) the traveler being related to the related individual through the electronic social network, (iii) the matching trips between the traveler and the related individual through the electronic social network, and (iv) raw data, of at least one of the traveler and the related individual through the electronic social network, related to the matching trips between the traveler and the related individual through the electronic social network; and displaying the advertisement to the traveler via the electronic social network on the Internet.

2. The computer-implemented method of claim 1, wherein the electronic social network receives and provides to the traveler information regarding related individuals to the traveler that are also members of the electronic social network.

3. The computer-implemented method of claim 1, wherein the travel plan further comprises transit information including at least one of flight, departure time, departure airport, arrival date and time, and arrival airport information.

4. The computer-implemented method of claim 1, wherein the travel plan is entered into an electronic location calendar within the electronic social network.

5. The computer-implemented method of claim 1, wherein the travel habit is derived from the number of times, as indicated in the previous travel plans, the traveler has traveled to a particular destination city identified in the future travel plan.

6. The computer-implemented method of claim 1, wherein the travel habit is related to a frequency, as indicated in the previous travel plans, at which the traveler has traveled to a particular airport in the future travel plan.

7. The computer-implemented method of claim 1, wherein the travel habit is related to the dates on which the traveler will be in a particular destination according to the future travel plan.

8. The computer-implemented method of claim 1, wherein the travel habit is related to the number of miles, as indicated in the previous travel plans, the traveler has traveled for work related purposes.

9. The computer-implemented method of claim 1, wherein the destination location is a city.

10. The computer-implemented method of claim 1, wherein the electronic social network is presented over the Internet as a website for access by client computers over HTTP.

11. The computer-implemented method of claim 1, wherein the advertisement is comprised of a URL.

12. A computer-implemented method, comprising:

receiving, at a server hosting an electronic social network over an Internet, a future travel plan indicating departure and destination locations and dates for a future trip planned by a traveler;

storing the future travel plan in a database storage device coupled to the server;

storing a profile associated with the traveler in the database storage device coupled to the server indicating travel habits of the traveler based on previous travel plans of the traveler received at the server;

receiving, at the server over the Internet, one or more future travel plans for one or more related individuals, wherein a related individual is related to the traveler by no more than one degree of separation through the electronic social network;

storing a received future travel plan for a related individual, wherein the received future travel plan comprises transit information including at least one of flight, departure time, departure airport, arrival date and time, and arrival airport information in the database storage device accessible by the server;

determining, by a data processing system, matching trips for the traveler and related individual whom are related by no more than one degree of separation on the electronic social network, and wherein the matching trips for the members of the electronic social network is determined by: (1) the traveler and related individual having a matching destination in their future travel plans, wherein a matching destination is a travel destination for the related individual specified in the received future travel plan for the related individual matching a travel destination specified in the future travel plan for the traveler, and (2) the traveler and related individual have a matching date for the matching destination in their future travel plans, wherein a matching date is a date specified in the received future travel plan for the related individual for the matching destination matching a date specified in the future travel plan for the traveler for the matching destination;

determining an advertisement based on (i) the future travel plan for the related individual, (ii) the matching trips between the traveler and the related individual, and (iii) the future travel plan and profile for the traveler; and displaying the advertisement to the traveler via the electronic social network on the Internet.

13. The computer-implemented method of claim 12, wherein the step of determining further comprises determining a targeted travel habit for the traveler based on the travel plan for the related individual and the future travel plan.

14. The computer-implemented method of claim 12, wherein a travel plan is entered into an electronic location calendar within the electronic social network.

* * * * *